(No Model.) 3 Sheets—Sheet 1.
W. C. NASON.
CAR TRUCK.
No. 440,645. Patented Nov. 18, 1890.
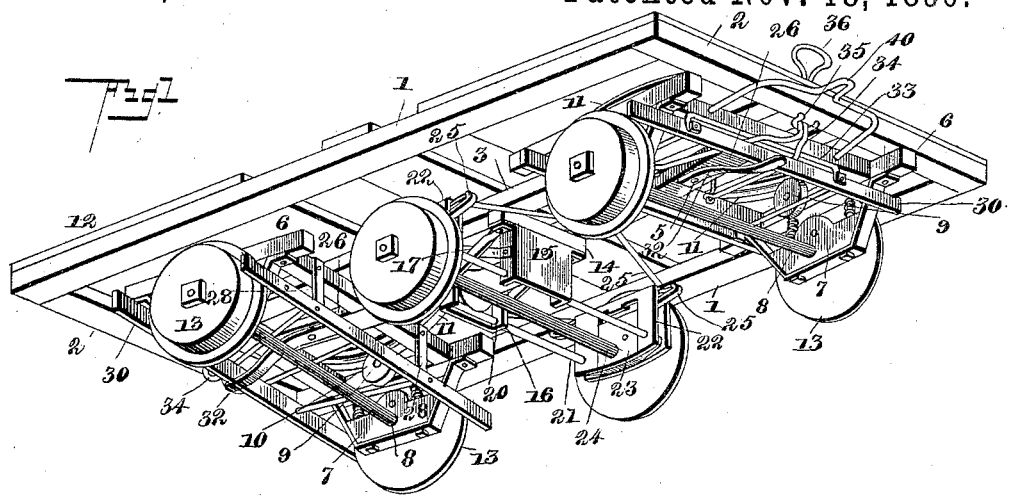
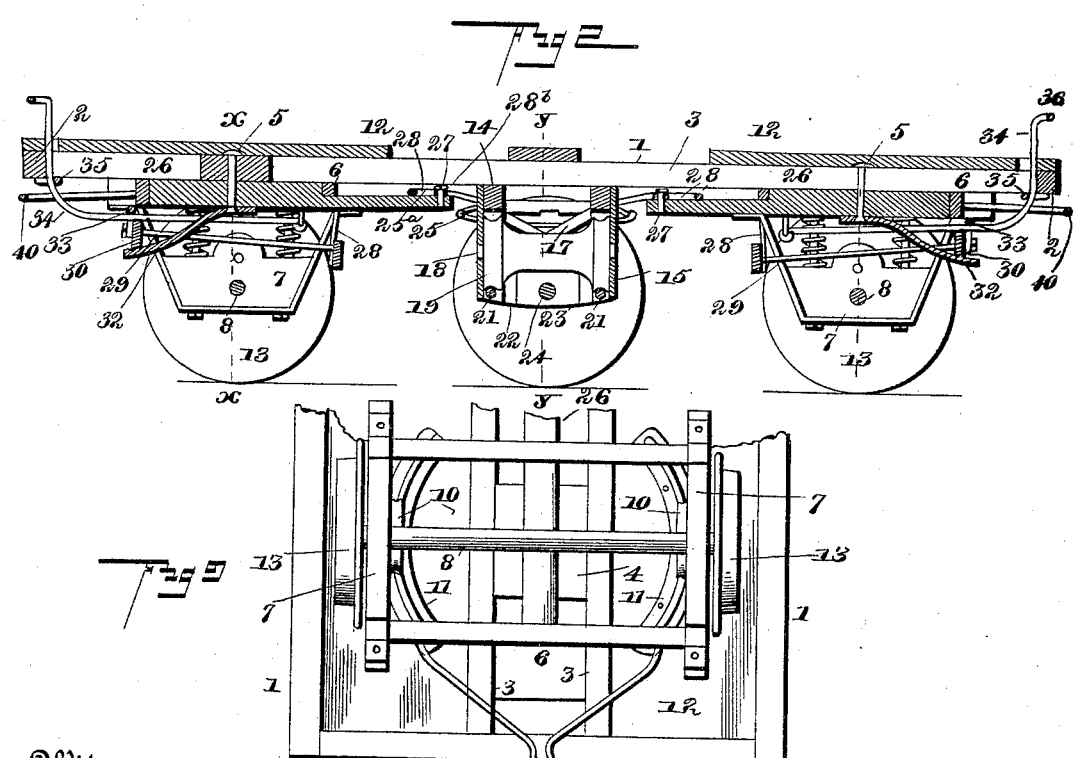
Witnesses
John Imrie
Wm. Bagger
Inventor
William C. Nason
By his Attorneys
C. A. Snow & Co.
THE NORRIS PETERS CO., PHOTO-LITHO., WASHINGTON, D. C.

(No Model.)
W. C. NASON.
CAR TRUCK.
No. 440,645. Patented Nov. 18, 1890.
3 Sheets—Sheet 2.
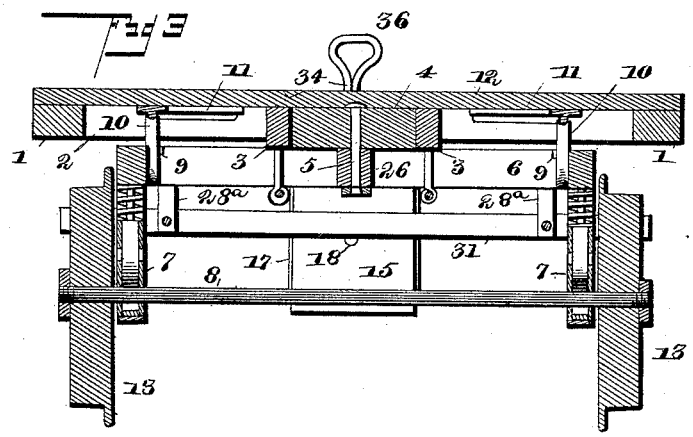
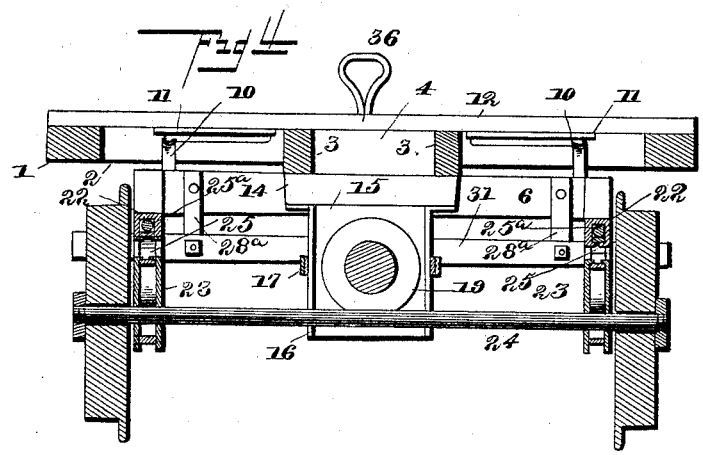
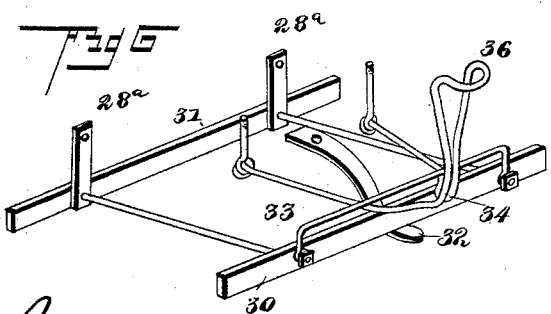
Witnesses
John Imirie
Wm Bagger
Inventor
William C. Nason
By his Attorneys
C. A. Snow & Co.

(No Model.) 3 Sheets—Sheet 3.
W. C. NASON.
CAR TRUCK.
No. 440,645. Patented Nov. 18, 1890.
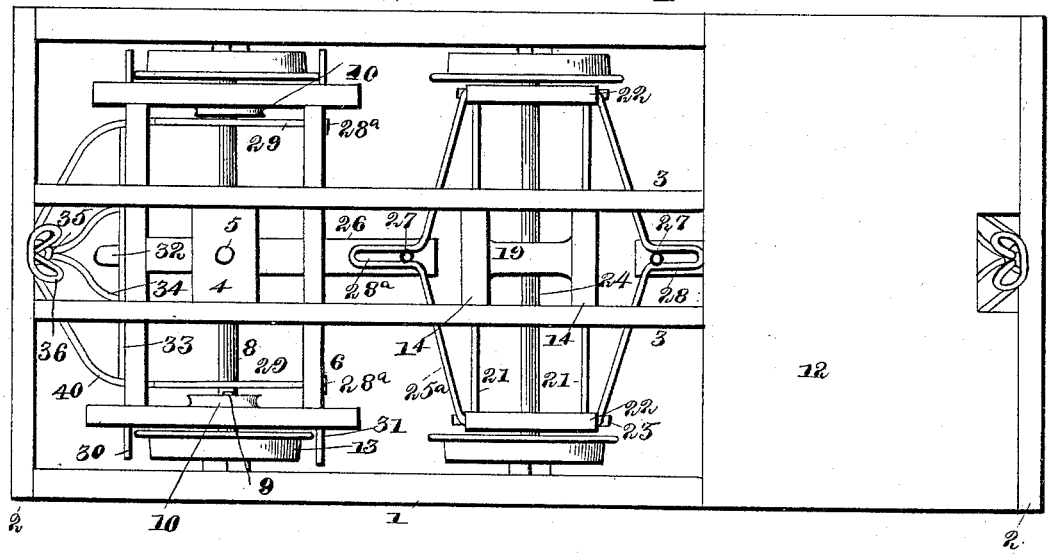
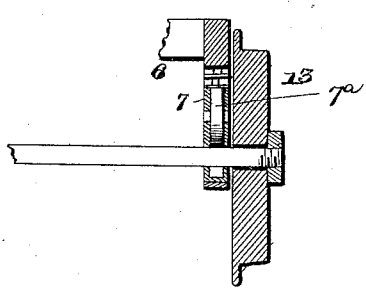
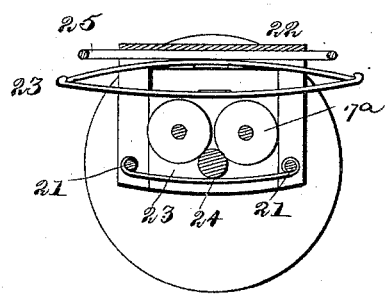
Witnesses
John Imrie
Wm. Bagger
Inventor
William C. Nason
By his Attorneys
C. A. Snow & Co

UNITED STATES PATENT OFFICE.

WILLIAM CHESTER NASON, OF NORTH WATERBOROUGH, MAINE.

CAR-TRUCK.

SPECIFICATION forming part of Letters Patent No. 440,645, dated November 18, 1890.

Application filed February 4, 1890. Serial No. 339,148. (No model.)

*To all whom it may concern:*

Be it known that I, WILLIAM CHESTER NASON, a citizen of the United States, residing at North Waterborough, in the county of York and State of Maine, have invented a new and useful Truck for Street and Railroad Cars, of which the following is a specification.

This invention relates to trucks for street and railroad cars, and it has for its objects to construct a truck in which the several revolving axles—three in number—are supplied with wheels that may revolve upon the axles and mounted in separate frames, the front and rear frames being mounted pivotally, while the central or intermediate frame is arranged to slide laterally, thereby enabling the wheels of the truck to adjust themselves to turn much sharper curves than they would be able to do otherwise.

My invention consists in the improved construction, arrangement, and combination of details, which will hereinafter be fully described, and pointed out in the claims.

In the drawings hereto annexed, Figure 1 is a perspective view, showing the truck embodying my improvements in an inverted position. Fig. 2 is a longitudinal sectional view taken centrally and vertically through the truck. Fig. 3 is a transverse vertical sectional view taken on the line $x$ $x$ of Fig. 2. Fig. 4 is a vertical transverse sectional view taken on the line $y$ $y$ of Fig. 2. Fig. 5 is a top view of the truck, showing the frame-work of the same partly broken away for the purpose of illustrating the detail construction more clearly. Fig. 6 is a detail view of the brake mechanism. Fig. 7 is a sectional view of the axle and wheel connection. Fig. 8 is a detail view of the end of an axle and the roller on truck-bearings. Fig. 9 is a bottom view of one end of the truck.

Like numerals of reference indicate like parts in all the figures.

The frame of my improved truck may be described as consisting of a rectangular frame comprising the sides 1 1, the end pieces 2 2, and the central longitudinal frame-beams 3 3, which are arranged parallel to each other, as shown. The frame-beams 3 3 are connected near their front and rear ends by means of blocks 4 4, which form bearings or means of attachment for the short vertical shafts 5 5, upon which are pivotally mounted the frames 6 6, which are of any suitable construction, and which are provided with boxes or truck-bearings 7, in which the transverse end axles 8 of the truck are journaled. The said boxes 7 have rollers $7^a$, journaled therein above the axles, which bear against the said rollers, thereby reducing friction to a minimum. The frames 6 are provided above the boxes 7 and in the same vertical plane as the axles 8 with inwardly-extending stud-axles 9, upon which are journaled grooved caster wheels or rollers 10, which bear upon segmental tracks 11, that are suitably secured upon the under side of the floor or floors 12, which are mounted upon the main truck-frame. It will be seen that by this construction the individual frames 6 are free to swing upon their respective shafts or pivots 5 with but little friction with relation to the main frame of the truck. Upon the ends of the shafts or axles 8 are revolubly mounted the flanged car-wheels 13, which may revolve upon the axles in going round a curve, thus preventing the wheels from dragging or sliding upon the rails.

The frame-beams 3 are provided with centrally-located cross-pieces 14, which are provided with downwardly-extending brackets 15, which are arranged parallel to each other and are provided with inwardly-extending flanges 16. Cross-braces 17 connect the brackets 15, as shown, for the purpose of bracing the said brackets. The brackets 15 are provided with bearings for a longitudinal shaft 18, provided near its ends and adjacent to the inner sides of the said brackets with grooved rollers 19, which may be constructed integrally with the said shaft. The flanges 16 of the brackets 15 are provided with perforations or bearings 20 for the transversely-sliding rods 21, to the outer ends of which are attached suitably-constructed frames 22, in which are mounted the vertically-sliding boxes 23, having roller-bearings for the central or intermediate axle 24. Springs 25 are interposed between the upper sides of the boxes 23 and the frames 22, said springs being either coiled, elliptical, or of any other suitable construction.

The frames 22 are connected independently of the transverse rods 21 by means of transverse yokes $25^a$, which serve in the nature of braces, and which impart considerable rigidity and stability to the said frames and to the boxes journaled therein. The transverse rods 21 are in practice guided in the annular grooves in the wheels or rollers 19, and by this construction undue friction is prevented during the operation of the device.

The frames 6 are provided with inwardly-extending arms or brackets 26, which are provided at their inner ends with upwardly-extending studs 27, upon which rollers 28 may be mounted. These rollers work in longitudinal slots $28^b$, formed centrally in the yokes $25^a$. It follows that when the frames 6 swing upon their respective pivots the yokes $25^a$ and the frames 22, carried by said yokes, will be forced laterally and outwardly in a direction corresponding with the movement of the pivoted or swinging frames 6. The result of this is that the wheels mounted upon the central or intermediate axle 24 will adapt themselves to the curvature of the track upon which the truck is traveling, and there will be no strain whatever either upon the track or upon the flanges of the wheels, for the reason that the axles will adjust themselves to run at right angles with the track on any curve. Hence the truck will be enabled to turn the sharpest of curves without danger of injury or breakage to any parts thereof.

The frames 6 are provided at their inner ends with pendent brackets $28^a$, in which are mounted the inner ends of longitudinal rods 29, the front and rear ends of which carry the brake-beams 30 and 31. The front or outer brake-beams 30 are forced automatically in an upward direction by means of leaf-springs 32, which may be mounted upon the king-bolts 5, by means of which the frames 6 are connected pivotally with the truck-frame. The said outer brake-beams 30 are also provided with yokes or bails 33, between which and the said brake-bars extend the operating yokes or levers 34, which are connected pivotally to arms or brackets 35, depending from the main truck-frames. The operating yokes or levers 34 are provided with brackets 36, extending upwardly through the main truck-frames and adapted to be operated by pressing down with the foot or by power of any suitable description.

Coupling-yokes 40 of suitable construction are connected or attached to the outer sides of the pivoted frames 6, as will be seen in the drawings.

The frames 6, in which the axles 8 are journaled, are to be provided with suitably-constructed boxes or truck-bearings for the said axles, which may be cushioned by springs of any suitable construction.

The operation of my invention and its advantages will be readily understood from the foregoing description, taken in connection with the drawings hereto annexed. It will be seen that the front and rear frames of the truck are pivoted independently, so as to be capable of swinging in opposite directions for the purpose of enabling the wheels to adapt themselves to the curvatures of the tracks. At the same time the center frame, carrying the central or intermediate axle of the truck, will slide laterally to an extent proportionate to the swinging of the end frames, thereby preventing the central wheels from hugging the rails with their flanges and assisting them in conforming themselves to any curves in the track. This is accomplished without undue or excessive friction between the working parts of the device, owing to the herein-described arrangement of friction-rollers, which take up the wear and friction of contiguous parts. The brake mechanism is exceedingly simple in its construction, and it will be observed that when the outer brake-bar is depressed downward against the tension of the spring 32 it will be carried down with the wheels, and will thus be practically set automatically and with the expense of but trifling force on the part of the operator. At the same time as soon as the pressure in a downward direction upon the said brake-bar is released, the brake-bar will be restored by the spring 32 to its normal or inoperative position.

The general construction of the device is simple and inexpensive, and cars of ordinary construction may be readily mounted upon my improved trucks without necessitating expensive or troublesome changes.

Having described my invention, what I claim is—

1. In a car-truck, the combination of the main truck-frame, the end frames mounted upon vertical bolts or pivots, the transversely-sliding central frame having yokes provided with longitudinal slots, and the arms extending inwardly upon the end frames and having pins or rollers working in the said slots, substantially as set forth.

2. In a car-truck, the combination, with the main truck-frame, of the swinging frames mounted upon vertical bolts or pivots and having the roller-bearings, the axles and the flanged wheels loosely mounted on said axles, grooved caster wheels or rollers suitably journaled upon the said swinging frames, and the segmental tracks for the said caster-wheels, secured upon the under side of the car-floor, substantially as and for the purpose set forth.

3. The combination of the main truck-frame, the swinging frames mounted pivotally upon vertical bolts under the same, the boxes mounted in the said swinging frames and having roller-bearings, the interposed spring-cushions, and the axles journaled in the said boxes bearing against the rollers and having the flanged wheels loosely mounted on said axles, substantially as set forth.

4. The combination of the main truck-frame, the swinging end frames mounted upon vertical pivotal bolts, the vertically-sliding boxes mounted in the said frames, the interposed spring-cushions, the grooved wheels or casters journaled upon the said frames, and the segmental tracks for said casters, secured upon the under side of the car-floor, substantially as set forth.

5. The combination of the main truck-frame, the swinging end frames mounted upon vertical pivotal bolts, the depending flanged brackets arranged between said swinging frames, the transversely-sliding guide-rods mounted in the flanges of said brackets and supporting a pair of frames, the boxes mounted in said frames and in the swinging end frames, having the transverse axles carrying the flanged wheels, the transverse yokes connecting the central boxes and provided with longitudinal slots, and the arms or brackets extending inwardly from the swinging end frames and having pins or rollers playing in the said slots, substantially as set forth.

6. In a car-truck, the combination, with the main truck-frame, of the swinging end frames mounted upon vertical pivotal bolts and having transverse axles and wheels mounted thereon, the central or intermediate depending flanged brackets, a shaft mounted longitudinally in the latter and having grooved rollers, the transversely-sliding guide-rods engaging the said rollers, the frame mounted at the ends of said guide-rods, the boxes mounted in said frames and having roller-bearings for transverse axles provided with wheels mounted revolubly upon the axles, and suitably-sliding connections between the laterally-sliding central wheel-frame and the swinging end frame, substantially as set forth.

7. In a car-truck, the combination, with the swinging wheel carrying end frames mounted upon vertical pivotal bolts, of the depending brackets, the longitudinal rods mounted in the latter and having brake-bars at their front and rear ends, the springs arranged to force the front or outer brake-bars automatically in an upward direction, and means for depressing the said brake-bars against the tension of the springs, substantially as set forth.

8. The combination of the truck-frame, the swinging end frames mounted upon vertical pivots, the brackets depending from the inner sides of said swinging frames, the longitudinal bars mounted on said brackets, the brake-bars secured upon said rods, the leaf-springs mounted upon the pivotal bolts and bearing upwardly against the under sides of said brake-bars, and means for depressing the latter against the tension of the springs, substantially as set forth.

9. In a car-truck, the combination of the swinging wheel carrying end frames, the transversely-sliding wheel carrying intermediate frames connected slidingly with the swinging end frames, the brackets depending from the inner ends of the latter, the rods mounted in said brackets and supporting the transverse brake-bars, the springs arranged to force the latter in an upward direction, the yokes or bails attached to the outer brake-bars, and the operating yokes or levers pivoted to brackets depending from the truck-frame, extending between the outer brake-bars and the bails attached to the latter and bent upwardly through the truck-frame, substantially in the manner and for the purpose herein set forth.

In testimony that I claim the foregoing as my own I have hereto affixed my signature in presence of two witnesses.

WILLIAM CHESTER NASON.

Witnesses:
H. A. McNEALLY,
M. H. KELLY.